United States Patent [19]

Stumpf

[11] Patent Number: 4,922,811
[45] Date of Patent: May 8, 1990

[54] BREAD PAN FABRICATED OF LIQUID-CRYSTAL POLYMER

[75] Inventor: Sherri O. Stumpf, Andover, Minn.
[73] Assignee: Premier Pan Products Co., Inc., Andover, Minn.
[21] Appl. No.: 178,527
[22] Filed: Apr. 7, 1988
[51] Int. Cl.⁵ ............................................. A47J 27/00
[52] U.S. Cl. .................................. 99/443 C; 99/449; 206/818; 220/23.4; 264/328.1; 428/1; 528/192
[58] Field of Search ............ 99/324, 342, 343, 443 C, 99/443 R, 448, 449; 264/176.1, 225, 310, 331.11, 328.1; 220/23.2, 23.4, 23.6, 83; 206/818; 428/1; 528/192, 193

[56] References Cited

U.S. PATENT DOCUMENTS

| 2,407,021 | 9/1946 | Langel | 220/23.4 |
|---|---|---|---|
| 3,406,860 | 10/1968 | Kaufman et al. | 220/23.4 |
| 3,971,361 | 7/1976 | Hurko | 206/818 |
| 4,247,514 | 1/1981 | Luise | 528/193 |
| 4,398,017 | 8/1983 | Go | 528/193 |
| 4,440,920 | 4/1984 | Fujikake et al. | 528/193 |
| 4,444,980 | 4/1984 | Deex | 528/193 |
| 4,614,629 | 9/1986 | Economy et al. | 264/176.1 |
| 4,663,422 | 5/1987 | Inoue et al. | 528/193 |
| 4,746,721 | 5/1988 | Ueno et al. | 528/193 |
| 4,764,327 | 8/1988 | Nozaki et al. | 264/225 |

FOREIGN PATENT DOCUMENTS

| 2829440 | 1/1980 | Fed. Rep. of Germany | 206/818 |
|---|---|---|---|
| 1206139 | 9/1970 | United Kingdom | 220/23.4 |

Primary Examiner—Jimmy G. Foster
Attorney, Agent, or Firm—Kinney & Lange

[57] ABSTRACT

A bakery pan formed of injection molded liquid-crystal polymer has side walls and end walls which include an integral rib for receiving and retaining an encircling strap enabling several of the pans to be supported together in a module. A ferrous or magnetic material member is secured to the bottom of the pan, enabling the non-ferrous pan to be used in magnetic conveyor systems, and the band used for holding the pans in a module also is a magnetic material to permit holding the pans with overhead magnets.

15 Claims, 2 Drawing Sheets

BREAD PAN FABRICATED OF LIQUID-CRYSTAL POLYMER

BACKGROUND OF THE INVENTION

1. Field of the Invention.

The present invention relates to bakeware and more specifically to a bread pan fabricated of a liquid-crystal polymer.

2. Description of the Prior Art.

Bakeware, and specifically bread pans, are presently fabricated of a variety of materials. In the commercial baking industry, the bakeware is typically fabricated of sheet metal. Metal bakeware has several disadvantages. The pans require greasing or glazing before each baking cycle so that the bakery product will not adhere to the pan following baking. The forming operation can form envelope folds which are unsanitary and also the folds tend to retain trapped acid from the glazing operation. The metal pans remain hot upon removal from the oven and therefore cannot be easily handled and then are relatively heavy and therefore somewhat burdensome to handle. Metal pans are also typically difficult to clean because of the sharp corners created during the metal-forming operations.

Although bakeware has been fabricated of other materials, such pans also suffer disadvantages. For example, bakeware is sometimes fabricated of expensive but easily broken glass or ceramic material. These pans are therefore not suitable for the relatively rough handling in a commercial bakery environment, in which sets of pans may be dropped several feet onto concrete floors.

Cookware suitable for microwave ovens is often injection-molded of thermoplastic materials. However, such materials often have relatively low melting points and therefore are also unsuitable for use at conventional baking temperatures.

SUMMARY OF THE INVENTION

The aforementioned problems are overcome in the present invention comprising a bread pan injection-molded of a liquid-crystal polymer. Liquid-crystal polymers have relatively high melting and softening points and are therefore well-suited for conventional baking pans. The material does not require grease or glazing prior to baking, since bakery products will not readily adhere to the material. Further, the exterior surfaces of the pans cool quickly upon removal from the oven and therefore can be immediately and easily handled by workers. The pans are relatively light-weight compared to metal, ceramic, and glass bakeware. Because the articles can be injection-molded, corners can be formed round to facilitate cleaning of the pans. The pans are extremely strong and particularly well-adapted to the rough handling of a commercial baking operation.

In a preferred form of the invention, strap-retaining ribs are integrally molded into the exterior side wall of the pan, enabling the pans to be assembled into a set or module of pans used for baking. A (magnetic) material strip also can be carried by the pan bottom, enabling the pan to be transported by conventional magnetic conveyor systems.

These and other objects, advantages, and features of the invention will be more readily understood and appreciated by reference to the detailed description of the preferred embodiment and the drawings.

DETAILED DESCRIPTION OF THE PREFERRED EMBODIMENTS

Figure 1:
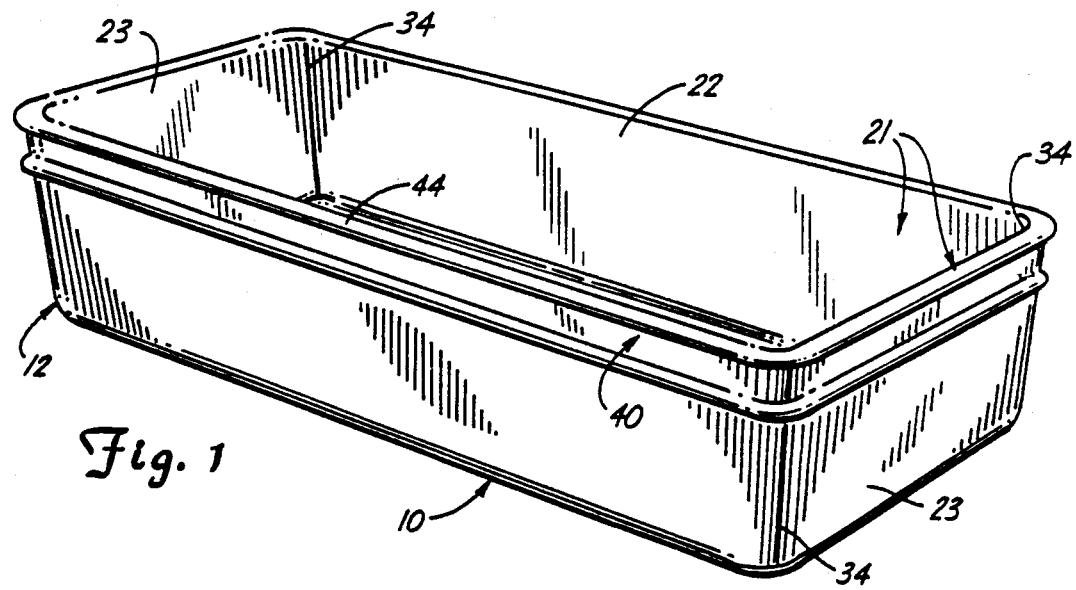
FIG. 1 is a perspective view of the bread pan of the present invention.

A bread pan fabricated in accordance with a preferred embodiment of the invention is illustrated in the drawings and generally designated 10. Generally speaking, the pan includes a pan body 12 as shown, molded from a liquid-crystal polymer. As shown a ferrous (magnetic material) strap 14 is secured, with rivets 15, to the pan bottom enabling the pan to be handled in conventional fashion by commercial bakery magnetic conveyors. The strip has to have the same temperature coefficient of expansion as the liquid-crystal polymer, or two separate ferrous or magnetic material discs can be used. The pan body includes a bottom 20 and two upright walls 21 including side walls 22 and two end walls 23 integrally molded with the bottom 20 and extending upwardly therefrom. The walls 21 form a receptacle for bakery bread dough. The pan body 12 is fabricated of a liquid-crystal polymer, which is a material class generally well known to those having ordinary skill in the polymer art. For example, these materials are discussed in a survey article entitled *Liquid Crystal Polymers: How They Process and Why* by Duska, which appeared in the December 1986 issue of *Plastics Engineering* at pages 39–42. Such materials have been unexpectedly discovered by the present inventor to be particularly well suited to bakeware, especially that bakeware designed for commercial baking operations. Food products do not adhere to these materials and therefore the prior need for greasing or glazing is eliminated. The material can be subjected to conventional baking temperatures without any deformation or reduction in rigidity. The outer surfaces of pans made from the material cool quickly when removed from a high-temperature environment, enabling the pans to be almost immediately and easily handled by workers upon removal from the oven. The pans also are relatively light-weight and tough, further facilitating handling by workers and minimizing damage.

The pan of the present invention is preferably molded of a liquid-crystal polymer sold by Dartco Manufacturing, Inc. of Augusta, GA under the trademark XYDAR RC-210. This material is a glass-fiber reinforced liquid-crystal polymer having a softening point of 676 degrees Fahrenheit and a deformation temperature under load (DTUL) of 655 degrees Fahrenheit at 264 psi.

A presently less preferred but acceptable mterial is the liquid-crystal polymer sold by Amoco under the trademark TORLON. However, the TORLON material has a five-day cure time and therefore creates significant manufacturing difficulties.

The pan bottom wall 20 is generally planar and rectangular in plan view. As illustrated, the bottom 20 is approximately three times as long as it is wide. Of course, other shapes and proportions will be readily apparent to those having ordinary skill in the art, based upon the article to be baked. Two parallel ribs 24A and 24B extend along the underside of the bottom proximate one side edge of the bottom 20, while a similar pair of ribs 26A and 26B extend along the underside proximate the opposite bottom edge. All of the ribs 24 and 26 are generally parallel to one another and molded in place.

Figure 3:
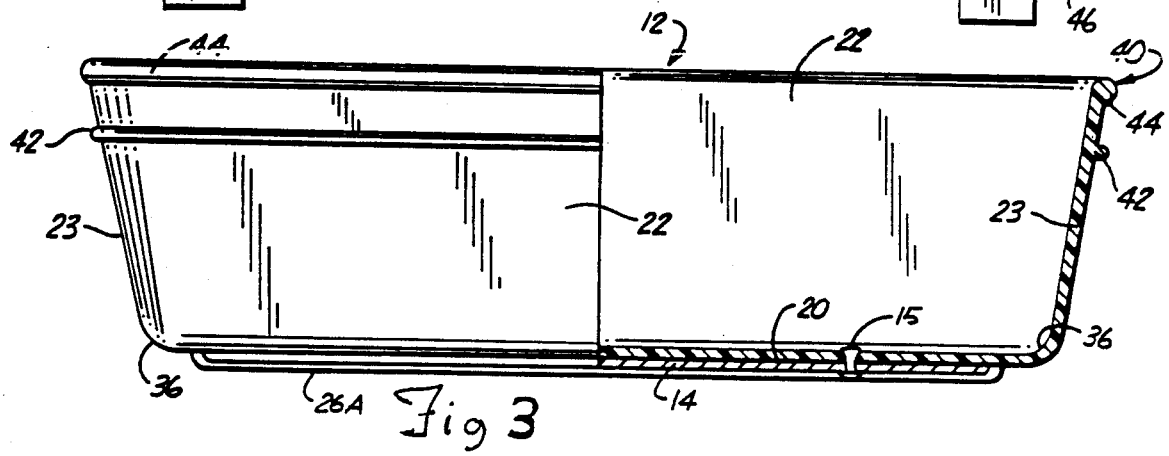
FIG. 3 is a side elevational view, partially in section, thereof.
Figure 4:
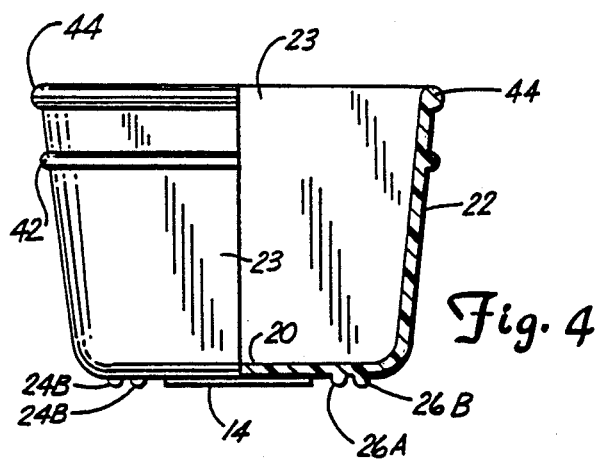
FIG. 4 is an end elevational view, partially in section, thereof.

As most clearly illustrated in FIGS. 3 and 4, the side walls 22 and end walls 23, which are joined at rounded corners 34, are inclined approximately 8 degrees from the vertical to facilitate product release. The side walls and end walls terminate along an upper peripheral edge 33. The side walls 22 and end walls 23 meet in at the gently rounded corners 34. Similarly the side walls 22 and end walls 23 join the bottom 20 at gently rounded corners 36. As presently preferred, the wall thickness throughout the pan body 12 is more than 0.060 inch; and the radius of corners 34 and 36 is in the range of 0.280 inch. The radiused corners 34 and 36 facilitate cleaning of the pan since food or other particulate matter deposited therein can be relatively easily accessed and removed therefrom.

Figure 5:
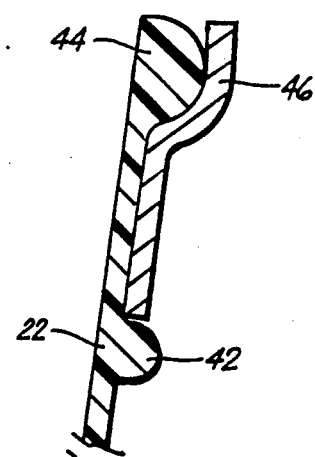
FIG. 5 is an enlarged fragmentary view of the pan bottom and side wall showing the strap-retaining structure.
Figure 6:
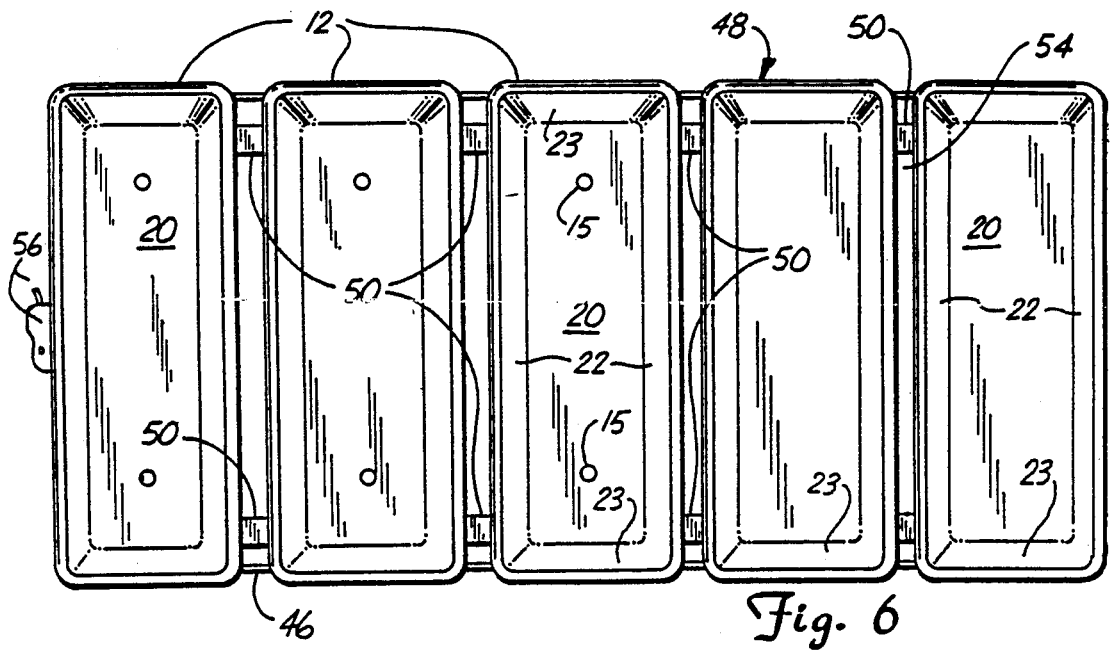
FIG. 6 is a perspective view of a plurality of the bread pans fastened together for forming a baking module of pans.

A strap-retaining structure 40 (FIG. 5) is integrally molded into the pan side walls 22 and end walls 23 and is generally uniform in cross section around the perimeter of the pan 10. The strap-retaining structure 40 includes a peripheral stop flange or rib 42 and a peripheral upper edge rounded flange or rib 44 smoothly molded into the side and end walls. The stop flange 42 and the upper rounded flange 44 are spaced apart vertically and an assembly band or strap 46 is formed to fit around the outer surface of the upper flange 44 and above the rib 42. The strap is ferrous, or other magnetic material and its upper edge is at the level of the upper edge of the pan so overhead magnets can be used for handling a pan module or assembly of several pans indicated at 48 in FIG. 6.

This assembly of pans or pan module 48 includes, as shown, five of the pans 10. The individual pans 10 are spaced apart with spacer blocks shown at 50 that fit above the rib 42 and which can be made of the same molded material as the pans. These blocks can be tubular, if desired to cut down on weight and material used, but they are of sufficient length so that when they are engaging the outer surface of the adjacent side walls of two of the pans placed side by side, the pans are spaced apart with a gap shown at 54, the spacer blocks can have suitable retainers to hold them on the ribs 42. The rib 44 can also have a recess made with a surface to frictionally hold the spacer blocks temporarily. After the strap 46 is placed around the assembly and can be fastened with a suitable adjustable clamp indicated at 56, at one end of the unit. Additional clamps can be used. The clamp is shown schematically, because it can be one that is of the type that will take up and apply tension to the strap to hold it tightly.

Figure 2:
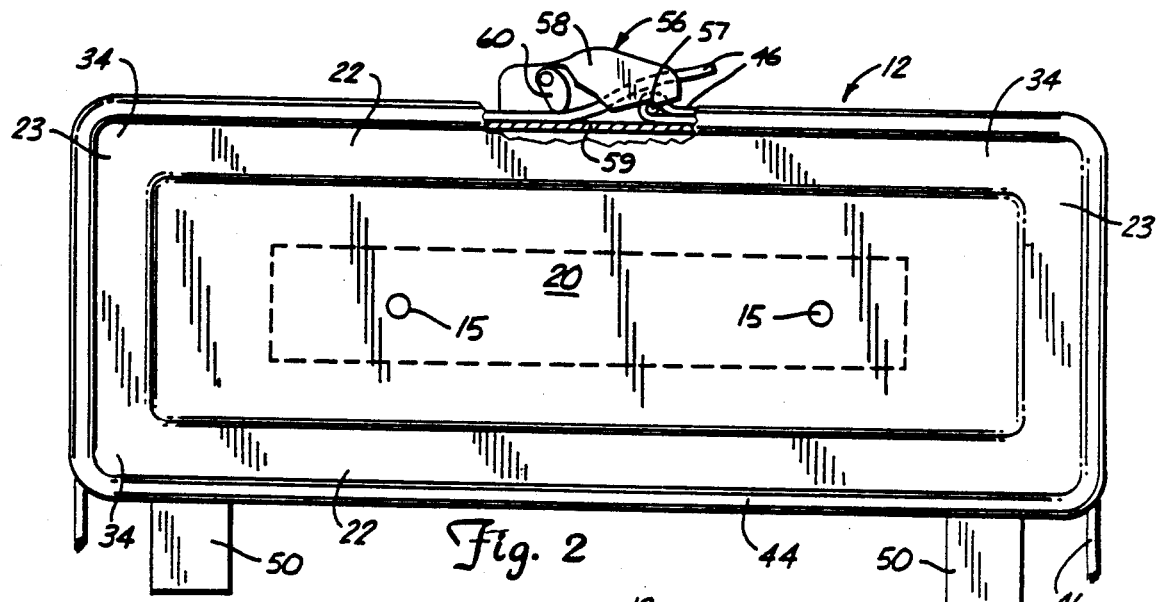
FIG. 2 is a top plan view thereof.

As can be seen in FIG. 2, the clamp can be a cam lock clamp. One end of strap 46 is anchored to a pin 57 on the clamp body 58. The other or free end of the strap 46 passes between the base surface 59 of of the clamp body and a cam 60 that is pivotal on the body 58 and which wedges the strap to lock it after tightening the strap.

The strap 46 can have a narrower flat section at the clamp and has to be made of an FDA approved material. Preferably it is a magnetic material that will permit overhead magnets to support the pan assembly or module 48 for transporting the pans when empty or partially filled. The strap 46 could also support metal tabs for magnetic lifting at locations spaced around the periphery of the pan module.

The strap 46 can be tightened with a screw tightening clamp such as that used with a hose clamp, for example, and there can be two of these clamps, one at each end if desired. The space 54 permits air to flow up along all of the side walls of the pans during baking, to insure uniform baking and adequate operation of the pans.

The band of course can be any type of band desired, and can be terminated so that it only fits around the rib 44 at the upper end of the pans, if desired. In other words it does not have to be as wide as that shown in FIG. 5, but can be terminated in any desired manner.

The clamps that are used should be ones that stay out of the way as much as possible, in order to avoid interference. A self-contained baking frame that supports several pans in a module also could be used. The lower rib 42 could snap into a receptacle in such self-contained frame to retain the pan in place.

The ferrous (or other magnetic material) strap 14 is secured to the bottom of the pan 20, must be of an FDA approved material. The thickness of the strap 14 is preferably no greater than the height of the ribs 24 and 26 so that the pan rests primarily on the ribs and does not rock upon the strap. The strap 14 is retained in position by a pair of countersunk head rivets 15 which extend through both the strap and the pan bottom 20.

MANUFACTURE AND USE

Manufacture of the bread pan 10 begins with the molding of the pan body 12. The pan body is formed by injection-molding a liquid-crystal polymer using techniques generally well known to those having ordinary skill in the polymer and injection-molding arts. Preferably, the specific liquid-crystal polymer utilized has a relatively short cure time to facilitate the manufacturing process. The rivet holes are drilled in the pan bottom preferably using a carbide-tipped drill bit. The strap 14 is then secured to the pan bottom by rivets 15 installed through the strap and the pan bottom 20. The straps 14, if fastened in two locations must have a coefficient of thermal expansion very close to the polymer used for molding the pan. Otherwise a separate magnetic material disc can be used at each rivet 15.

Although the pans 10 can be utilized individually in a baking operation, it will be preferred in many instances to mount the pans in a module, (FIG. 6) or a separate baking pan frame. Such mounting facilitates baking processes.

Although the present invention has been described with reference to preferred embodiments, workers skilled in the art will recognize that changes may be made in form and detail without departing from the spirit and scope of the invention.

What is claimed is:

1. A bakeware piece comprising a one-piece injection-molded article for supporting product to be baked and fabricated of a liquid-crystal polymer.

2. A bakeware piece as defined in claim 1 further comprising a magnetic material carried by said molded article enabling said article to be transported by a magnetic transportation system.

3. A bakeware piece as defined in claim 1 where said magentic material is a member secured to the exterior of said molded article.

4. A bakeware piece as defined in claim 1 wherein said molded article includes a bottom and side wall means extending upwardly therefrom, and side wall means including integral retainer means, and means positioned adjacent said side wall and vertically positioned by said integral retaining means to form a bake piece module.

5. A bread pan assembly comprising: a one-piece, injection-molded pan unitarily molded of a liquid-crystal polymer, said bread pan having a bottom and generally rectangular walls extending upwardly therefrom to form an open top enclosure, said pan including flange means formed about the perimeter of said side wall for providing means for supporting a strap for assembling the pan into a module.

6. The bread pan of claim 5 and a magnetic material member secured to said pan bottom, whereby said pan assembly can be transported by a magnetic conveyor.

7. A bakeware piece comprising a one-piece injection-molded article for supporting product to be baked and fabricated of a liquid-crystal polymer, said molded article including a bottom, and side wall means extending upwardly therefrom, said side wall means including retainer means comprising a pair of vertically spaced peripheral ribs, one of said ribs being adjacent a top edge of the bakeware piece and rounded to the outer side, means positioned between the ribs to form a bakeware piece module comprising a strap fitting around exterior portions of a plurality of adjacent bakeware pieces, and clamp means for tightening the strap means about such plurality of bakeware pieces.

8. A bakeware piece as defined in claim 7 wherein said bakeware, piece is a bread pan.

9. A module of a plurality of bakery pieces each comprising an injection molded pan, injected molded from a liquid crystal polymer, and each pan having a bottom wall, and side walls and end walls extending upwardly from the bottom wall to form an open topped pan, the upper edges of the side walls and end walls having a peripheral rib molded in a rounded cross section that overhangs the exterior of the lower portions of the side walls and end walls, the pans being positioned with at least one side wall adjacent the side wall of another pan, spacer means between the adjacent side walls of adjacent pans, and a strap formed to fit around the periphery of the pans forming the module to hold the pans forming the module together.

10. The module of claim 9, and adjustable clamp means for said strap to permit controlling the amount of tension in the strap holding the pans in said module.

11. The module of claim 10 wherein said strap is made of a magnetic material, and is at a level substantially as high as the upper edges of said side walls and end walls to permit magnet to retain said module by attraction to said band from a position above the pans.

12. The module of claim 9 wherein the bottoms of the pans carry a magnetic material for use with a magnetic conveyor.

13. A method of fabricating a bakeware article comprising injection molding the article of a liquid-crystal polymer.

14. A method as defined in claim 13 further comprising adding a magnetic material to the article, whereby the article can be transported by a magnetic transportation system.

15. A method as defined in claim 14 wherein said adding step includes attaching a magnetic material member to the article.

* * * * *

UNITED STATES PATENT AND TRADEMARK OFFICE
CERTIFICATE OF CORRECTION

PATENT NO. : 4,922,811
DATED : May 8, 1990
INVENTOR(S) : Sherri O. Stumpf

It is certified that error appears in the above-identified patent and that said Letters Patent is hereby corrected as shown below:

Title page:

Under the References Cited Section, insert the following:

OTHER PUBLICATIONS

"Liquid Crystal Polymers: How They Process and Why, by Duska, December 1986 issue of Plastics Engineering Col. 5, line 2, delete "magentic", insert --magnetic--

Col. 6, line 21, delete "magnet", insert --magnets--

Signed and Sealed this

Seventeenth Day of September, 1991

Attest:

HARRY F. MANBECK, JR.

*Attesting Officer*     *Commissioner of Patents and Trademarks*